United States Patent [19]
Willacy

[11] Patent Number: 5,143,550
[45] Date of Patent: Sep. 1, 1992

[54] WASTE DISPOSAL

[76] Inventor: George A. Willacy, 35, Henblas, Flint Mountain, Clwyd CH6 5PW, United Kingdom

[21] Appl. No.: 689,796
[22] PCT Filed: Oct. 2, 1989
[86] PCT No.: PCT/GB89/01174
§ 371 Date: May 21, 1991
§ 102(e) Date: May 21, 1991
[87] PCT Pub. No.: WO90/03951
PCT Pub. Date: Apr. 19, 1990

[30] Foreign Application Priority Data

Oct. 8, 1988 [GB] United Kingdom ............... 8823670

[51] Int. Cl.$^5$ .................... C04B 7/00; C04B 18/02; B09B 3/00
[52] U.S. Cl. ............................ 106/697; 106/802; 106/900; 502/60; 502/62; 502/100; 502/150; 501/155
[58] Field of Search ............... 208/111; 106/697, 900, 106/802, 499; 501/155; 502/60, 62, 100, 150

[56] References Cited

U.S. PATENT DOCUMENTS

| | | | |
|---|---|---|---|
| 4,028,130 | 6/1977 | Webster | 106/120 |
| 4,385,121 | 5/1983 | Knowlton | 435/244 |
| 5,032,548 | 7/1991 | Lowe | 501/59 |

*Primary Examiner*—Karl Group
*Assistant Examiner*—Michael A. Marcheschi
*Attorney, Agent, or Firm*—Rodman & Rodman

[57] ABSTRACT

The method of disposal of hydrocarbon sludge (such as petroleum-derived sludge residue from a hydrocracker) comprises mixing the sludge with spent silica-alumina catalyst particulate fines, of particle size not exceeding 50 micrometers, so as to form friable aggregates of the particulate fines in which the individual particles are bound together by the sludge. The resulting formulation is useful, inter alia, for road-making.

14 Claims, No Drawings

WASTE DISPOSAL

The present invention is concerned with a method of waste disposal, and by-products thereof.

Heavy oil from storage tank bottoms and from other hydrocarbon processing operations often contains a high proportion of solid sediment, and poses a particularly severe waste disposal problem. This is particularly so with sedimentation residue from a hydrocracker or the like, which generally contains a very substantial proportion of catalyst. The waste material cannot be used for landfill because of the likelihood of leaching of toxic materials therefrom. Conventionally, such material (referred to herein as hydrocarbon sludge) has been disposed of by physically removing it from the tank, and then incinerating it.

A recently suggested process involves thoroughly mixing the hydrocarbon sludge with a hydrophobically treated calcareous additive (such as lime), and then compacting the resulting powdery mixture. While this process is believed to work reasonably satisfactorily, the cost of the hydrophobically treated lime is by no means negligible, and makes a significant contribution to the overall cost of the process.

Silica-alumina based catalyst fines (for example, from catalytic cracking plants) are themselves waste materials which are difficult to dispose of, because such materials tend to become airborne.

I have now devised a method which enables such catalyst fines and hydrocarbon sludge to be disposed of concurrently, which method also produces a product which is useful in its own right.

According to a first aspect of the invention, therefore, there is provided a method of disposal of hydrocarbon sludge, which comprises mixing said sludge with spent silica-alumina catalyst particulate fines, of particle size not exceeding 50 micrometers, so as to form friable aggregates of the particulate fines in which the individual particles are bound together by said sludge.

The hydrocarbon sludge and particulate fines are generally mixed together in an amount of 1.25 to 1.75 parts by weight of the particulate fines per part by weight of the hydrocarbon sludge. This ratio may be varied depending on the quantity of solid material in the hydrocarbon sludge; typically the sludge contains liquid hydrocarbon oil in an amount of 5 to 50% by weight (such as about 30% by weight). It is sometimes advantageous to pretreat the hydrocarbon sludge to remove some of the solids content prior to mixing with the silica-alumina catalyst fines.

The hydrocarbon sludge itself is generally derived from petroleum crude oil; the composition of the oil present in the sludge may resemble crude oil or derived hydrocarbon products having a boiling range at least as high as kerosene/diesel fuels.

The hydrocarbon sludge is preferably the sedimentation residue from a hydrocracker or the like; the heavier sedimented fraction of this material generally contains a substantial proportion of entrained solid catalyst from the hydrocracker, as outlined above.

The silica-alumina fines generally contain a preponderance of silica (such as about 70 to 90% by weight of silica). Such fines, which can be extracted from flues used in catalytic cracking towers, generally have a particle size of up to 5 micrometers.

The catalyst fines provide a large surface area suitable for adsorbing and binding the oil phase (which is generally bonded to the surface of the particles by physical forces such as Van der Waals forces). The resulting mixture is hydrophobic and granular, in which the majority of the individual particles are encapsulated, and bonded together, by the oil phase. The mixture is generally suitable for road making; alternatively it can be disposed of safely (having essentially no fines which would be likely to cause airborne contamination) in landfill or the like, and being resistant to leaching by water.

The present invention further comprises a granular formulation which coprises silica-alumina particles bonded together by means of hydrocarbon sludge.

The method of mixing of the particulate fines and the hydrocarbon sludge is not critical; the ingredients may be tumbled together, mixed using blades, or intimately blended by any other suitable method.

Typically the resulting mixture is such that it contains 60 to 90% solid material (including the catalyst fines and any solid detritus in the hydrocarbon sludge), with the remainder being hydrocarbon oil.

In an example, silica-alumina fines were tumbled with waste hydrocarbon sludge from the bottom of an oil settlement tank from a hydrocracker, such that the resulting mixture contained approximately 88% catalyst (220 kg of catalyst to 30 kg of oil) and had a hydrophobic granular consistency, having an appearance resembling that of brown sugar.

The fines composition was approximately 70% silica and 30% alumina. Other elements were present at trace levels (the most abundant being iron at about 1.5%, with about 0.3% sodium (as $Na_2O$), and vanadium (up to 3000 ppm); the particle density was 1400 kg/m$^3$.

Two runs were made, the particle size distributions being as set out in the following Table:

TABLE

| | Cumulative wt % less than stated size | |
|---|---|---|
| Microns | Run A | Run B |
| 1.2 | 11.4 | 32 |
| 1.5 | 18.6 | 36 |
| 1.9 | 25.0 | 41 |
| 2.4 | 30.3 | 47 |
| 3.0 | 37.6 | 54 |
| 3.9 | 48.1 | 64 |
| 5.0 | 58.3 | 73 |
| 6.4 | 70.1 | 81 |
| 8.2 | 81.9 | 87 |
| 10.5 | 90.1 | 91 |
| 13.6 | 95.3 | 95 |
| 17.7 | 99.4 | 98 |

Leaching experiments were performed on the resulting product as follows. A 30 cm column of 2.5 cm diameter was packed to a height of 15 cm with the granular product. Approximately one liter of water was percolated through the bed. The product when viewed from the base of the column appeared clear; there was no free oil visible. The water phase did however have a slight hydrocarbon odour which is believed to have resulted from the solubility of some of the hydrocarbons at the ppm level in the water phase (about 2 ppm); this indicates that the oil was substantially non-leachable by water, and bound in some way to the catalyst fines.

I claim:

1. In a method of disposal of hydrocarbon sludge, consisting essentially of mixing said sludge with spent silica-alumina catalyst, so as to form friable aggregates of the particulate fines, wherein the improvement comprises that the spent silica-alumina catalyst is in the form of particulate fines of a particle size not exceeding 50 microns and is present in a proportion by weight exceeding that of said sludge, so as to form friable aggregates of said particulate fines in which individual particles of said friable aggregates are bound together by said sludge.

2. A method according to claim 1, wherein said hydrocarbon sludge and particulate fines are mixed together in an amount of 1.25 to 1.75 parts by weight of the particulate fines per part by weight of the hydrocarbon sludge.

3. A method according to claim 1, wherein said sludge contains liquid hydrocarbon oil in an amount of 5 to 50% by weight.

4. A method according to any of claim 1, wherein said hydrocarbon sludge is pretreated to remove some of the solids content thereof prior to mixing with said silica-alumina catalyst fines.

5. A method according to any of claim 1, wherein said hydrocarbon sludge is derived from petroleum crude oil.

6. A method according to any of claim 1, wherein said hydrocarbon sludge comprises a sedimentation residue from a hydrocracker or the like.

7. A method according to any of claims 1, wherein said fines are extracted from flues used in catalytic cracking towers and have a particle size not exceeding 5 micrometers.

8. A method of disposal of hydrocarbon sludge predominantly comprising liquid hydrocarbon oil, consisting essentially of mixing said sludge with spent silica-alumina catalyst particulate fines of a particle size not exceeding 50 microns, in an amount of about 1.25 to 1.75 parts by weight of the catalyst fines per part by weight of the hydrocarbon sludge, to thereby form friable aggregates of the catalyst fines, wherein the individual particles of said catalyst fines are bound together by said sludge, and the majority of the individual particles are encapsulated by the oil phase of said sludge.

9. A granular composition consisting essentially of friable aggregates of about 1.25 to 1.75 parts by weight of spent silica-alumina catalyst particulate fines having a particle size not exceeding 50 microns, mixed with about 1 part by weight of hydrocarbon sludge predominantly comprising liquid hydrocarbon oil wherein the individual particles of said catalyst fines are bound together by said sludge, and wherein the majority of the individual particles are encapsulated by the oil phase of said sludge.

10. A granular composition consisting of friable aggregates which comprise hydrocarbon sludge mixed with spent silica-alumina catalyst particulate fines having a particle size not exceeding 50 microns wherein the individual particles of said friable aggregates are bonded together by means of said hydrocarbon sludge.

11. A method according to claim 1, wherein said silica-alumina fines contain about 70 to 90% by weight of silica.

12. A method according to claim 8, wherein said sludge contains liquid hydrocarbon oil in an amount of about 5 to 50% by weight.

13. A method according to claim 9, wherein said sludge contains liquid hydrocarbon oil in an amount of about 5 to 50% by weight.

14. A granular formulation according to claim 10, which comprises 60 to 90% by weight solid material, with the remainder comprising hydrocarbon oil.

* * * * *